United States Patent
Kume et al.

(10) Patent No.: US 7,785,543 B2
(45) Date of Patent: Aug. 31, 2010

(54) METHOD OF PROCESSING ALKALI-ACTIVATION EXHAUST GAS

(75) Inventors: Tetsuya Kume, Kakegawa (JP); Yasuyuki Higaonna, Kakegawa (JP); Kazuaki Yanagi, Kakegawa (JP)

(73) Assignee: Cataler Corporation, Shizuoka (JP)

( * ) Notice: Subject to any disclaimer, the term of this patent is extended or adjusted under 35 U.S.C. 154(b) by 0 days.

(21) Appl. No.: 12/476,597

(22) Filed: Jun. 2, 2009

(65) Prior Publication Data

US 2009/0232713 A1 Sep. 17, 2009

Related U.S. Application Data

(62) Division of application No. 11/599,385, filed on Nov. 15, 2006, now Pat. No. 7,556,786.

(30) Foreign Application Priority Data

Nov. 21, 2005 (JP) .............................. 2005-336042

(51) Int. Cl.
 *B01D 50/00* (2006.01)
(52) U.S. Cl. ..................................................... 422/168
(58) Field of Classification Search ................. 422/168, 422/151, 246; 423/210, 213.5
See application file for complete search history.

(56) References Cited

U.S. PATENT DOCUMENTS

| | | | |
|---|---|---|---|
| 3,957,949 A | 5/1976 | Senjo et al. | |
| 4,338,785 A | 7/1982 | Skala | |
| 5,401,472 A | 3/1995 | Kawakami et al. | |
| 2005/0181941 A1 | 8/2005 | Sugo et al. | |

FOREIGN PATENT DOCUMENTS

| | | |
|---|---|---|
| DE | 31 00 357 | 12/1981 |
| JP | A 5-306109 | 11/1993 |

OTHER PUBLICATIONS

"Water scrubber" source: http://www.answers.com/topic/water-scrubber.
"Alkali metal" source: http://www.Britannica.com/EBchecked/topic/15617/alkali-metal.

*Primary Examiner*—Tom Duong
(74) *Attorney, Agent, or Firm*—Oliff & Berridge, PLC

(57) ABSTRACT

Disclosed is an apparatus for processing an exhaust gas containing an alkaline substance, the exhaust gas being emitted when activating a carbon material with an alkaline substance. The apparatus includes a humidified-gas preparing device for preparing a humidified gas, which exhibits a dew point of 25° C. or more; a gas mixing device for mixing the humidified gas with the exhaust gas at a temperature equal to or greater than the dewpoint of the humidified gas, thereby generating a hydroxide of metallic alkali; and a trapping device for trapping the generated hydroxide out of the mixture gas of the humidified gas and the exhaust gas.

8 Claims, 3 Drawing Sheets

METHOD OF PROCESSING ALKALI-ACTIVATION EXHAUST GAS

CROSS-REFERENCE TO RELATED APPLICATION

This Application is a Divisional of U.S. patent application Ser. No. 11/599,385, the disclosure of which is hereby incorporated by reference herein in its entirety.

BACKGROUND OF THE INVENTION

Field of the Invention

The present invention relates to a method of processing an exhaust gas containing an alkaline substance, exhaust gas which is discharged when producing a carbon material exhibiting a high superficial area by activating a carbon material with an alkaline substance. In the present specification, the term, "alkaline substance," means metallic alkalis, and alkali compounds, such as alkali hydrides, alkali oxides, alkali hydroxides, alkali cyanides, alkali sulfides and alkali salts. Moreover, the term, "alkali compounds," specify the diluted, concentrated or even saturated solutions of alkaline substances.

It has been known that activated carbon exhibiting a high superficial area, for example, a high BET specific surface area, is useful in a variety of industrial applications, such as fractionating hydrocarbons, purifying industrial gases, removing harmful gases by means of adsorption, a countermeasure for the source of environmental pollution, liquid-phase purification in food industries or chemical industries, water disposal, collecting/fractionating liquid phases, catalysts or catalytic supports, and electric double layer capacitors. In particular, activated carbon has been required to exhibit a large superficial area, because the characteristics of activated carbon depend on how large the superficial area is.

Activated carbon exhibiting a large superficial area has been produced by carbonizing a carbon material to form a carbonized material and then activating the resultant carbonized material with an alkaline substance (that is, carrying out alkali activation). For example, Japanese Unexamined Patent Publication (KOKAI) No. 5-306,109 discloses a method for producing activated carbon in which a carbonized material is activated with alkali hydroxide.

However, in the production of activated carbon by means of alkali activation, production which is represented by the production process set forth in Japanese Unexamined Patent Publication (KOKAI) No. 5-306,109, it is needed to make the exhaust gas, which is discharged when carrying out the alkali activation, harmless by performing a certain process. Specifically, in exhaust gases which have undergone alkali activation, there exist alkaline substance which have been added to activate carbon materials. Accordingly, metallic alkalis generate as the temperature of exhaust gases decreases. Metallic alkalis have been known to be highly reactive to water, or moisture, so that they might ignite when they react with it. That is, there is a fear that a metallic alkali contained in the exhaust gas might ignite to react with moisture in air within an exhaust system after the alkali-activation process. When the ignition occurs within an exhaust system, it hinders the safe production of activated carbon. Moreover, when the exhaust gas contains a metallic alkali, there might arise a problem that the precipitating metallic alkali has corroded the pipe line of the exhaust system, because the pipe line is usually made of metallic pipes.

SUMMARY OF THE INVENTION

The present invention has been developed in view of the aforementioned problems. It is therefore an object of the present invention to provide a method of processing an exhaust gas, which is discharged when activating a carbon material with an alkaline substance, in particular, a method of processing an exhaust gas, method which can make the exhaust gas, which is discharged when activating a carbon material with an alkaline substance, harmless.

The inventors of the present invention have been investigating into how to process exhaust gases, which are discharged when activating a carbon material with an alkaline substance, over and over again. As a result, they have completed the present invention.

A method according to the present invention of processing an exhaust gas, which is discharged when activating a carbon material with an alkaline substance, comprises the steps of:

preparing a humidified gas, which exhibits a dew point of 25° C. or more, by mixing an inert gas with water vapor;

generating a hydroxide of metallic alkali by mixing the humidified gas with the exhaust gas; and trapping the generated hydroxide out of the mixture gas of the humidified gas and the exhaust gas.

In accordance with the present processing method, an alkaline substance, which is contained in the exhaust gas, is turned into a hydroxide, which exhibits low reactivity relatively, by reacting it with water vapor. Thereafter, the generated hydroxide is removed from the mixture gas of the humidified gas and the exhaust gas. Thus, in accordance with the present processing method, it is possible to remove alkaline substances from exhaust gases, which are discharged when activating a carbon material with an alkaline substance, readily and safely. Moreover, when employing the present processing method, it is possible to develop alkali activation itself safely because it is possible to process exhaust gases, which are discharged when activating a carbon material with an alkaline substance, safely.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
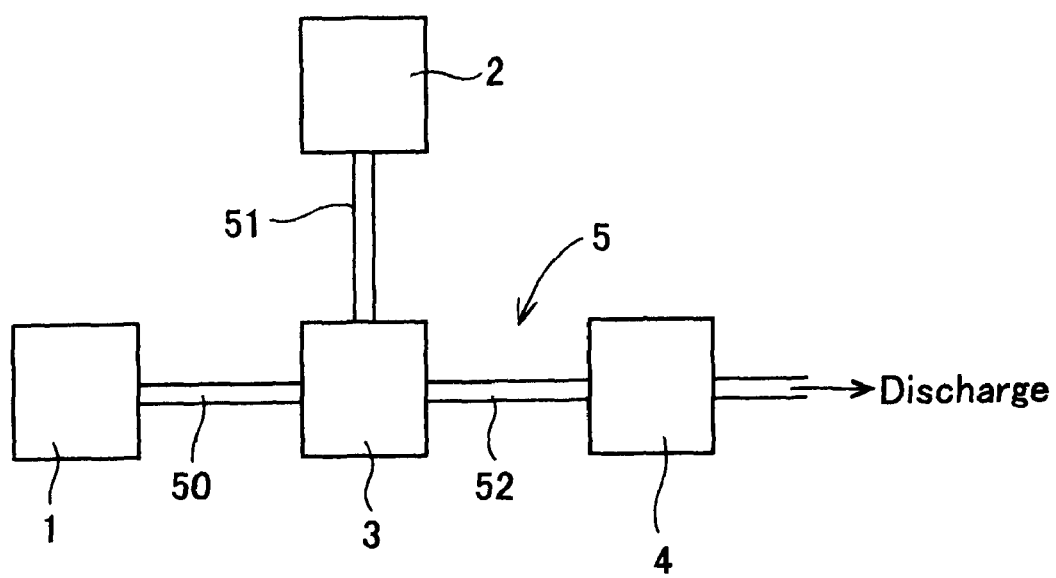
FIG. 1 is a diagram for illustrating an overall arrangement of a processing apparatus according to Example No. 1 of the present invention.

Having generally described the present invention, a further understanding can be obtained by reference to the specific preferred embodiments which are provided herein for the purpose of illustration only and not intended to limit the scope of the appended claims.

The present method of processing an exhaust gas is a method for processing an exhaust gas containing an alkaline substance, exhaust gas which is discharged when activating a carbon material with an alkaline substance. Note that alkali activation is employed to produce carbon materials which have large superficial areas, because it is possible to enlarge the specific surface area of carbon material when carbon material is activated with an alkaline substance.

In the present method of processing an exhaust gas, the carbon material, which is subjected to alkali activation, is not limited at all as far as it is a substance whose major constituent element is carbon being processable by means of activation treatment. The carbon material, which is subjected to alkali activation, can not only be carbonized (or graphitized) substances, which have been used in the conventional activation treatment for activated carbon, for instance, but also non-carbonized substances such as coal and phenol resins. However, the carbon material can preferably be carbonized materials.

The term, "carbonized materials," refers to carbonized (or graphitized) substances, and carbonized materials are composed of carbon alone. As a carbonized material, it is possible to use a substance which is produced by carbonizing a carbonaceous substance. However, the carbonaceous substance is not limited specifically. For example, as for the carbonized material, it is possible to exemplify substances which are produced by carbonizing carbonaceous raw materials such as palm-derived carbonaceous raw materials, wood-derived carbonaceous raw materials and coal-derived carbonaceous raw materials.

The alkaline substance used during the alkali activation of a carbon material can be substances as far as they give a carbon material, which has undergone an activation treatment, a large specific surface area. For example, as for the alkaline substance, it is possible to exemplify the compounds of metallic alkali such as LiOH, NaOH, KOH and $K_2CO_3$.

The present method of processing an exhaust gas is a method for processing an exhaust gas which is emitted when activating a carbon material with an alkaline substance. Hence, the present method does not at all limit the reaction conditions under which a carbon material is activated with an alkaline substance.

Specifically, the present method of processing an exhaust gas comprises the steps of: preparing a humidified gas; generating a hydroxide of metallic alkali; and trapping the generated hydroxide.

In the step of preparing a humidified gas, a humidified gas which exhibits a dewpoint of 25° C. or more is prepared. The resulting humidified gas reacts with metallic alkali, for instance, which is contained in the exhaust gas, to generate a hydroxide of metallic alkali when it is mixed with the exhaust gas in the following step.

Since the humidified gas exhibits a dew point of 25° C. or more, it is possible to generate hydroxide safely in the subsequent step. When the dew point of the humidified gas is more than 25° C., the content of water, which is contained in the humidified gas, increases sharply so that the hydroxylation is likely to develop between metallic alkali, which is contained in the exhaust gas, and the humidified gas when the humidified gas is mixed with the exhaust in the following step. Note that the humidified gas can preferably exhibit a dew point of 40° C. or more, further preferably 60° C. or more. Moreover, the dew point of the humidified gas can preferably fall in a range of from 25 to 80° C., further preferably in a range of from 40 to 80° C., furthermore preferably from 60 to 80° C.

In the present method of processing an exhaust gas, the production process of the humidified gas is not limited in particular as far as the produced humidified gas can react with metallic alkali, which is contained in the exhaust gas, to generate a hydroxide of metallic alkali in the subsequent step. For example, the humidified gas can preferably comprise a carrier gas composed of an inert gas, and water vapor dispersed in the carrier gas. In this instance, the inert gas, which makes the carrier gas, comprises a gas which does not react with the alkaline substance and carbon material. As for such a gas, it is possible to exemplify nitrogen gas, helium gas, neon gas and argon gas, for instance.

In the step of generating a hydroxide of metallic alkali, the humidified gas is mixed with the exhaust gas to generate a hydroxide of metallic alkali. In this step, highly reactive metallic alkali, which makes an alkaline substance, is turned into a hydroxide whose reactivity is lower than that of metallic alkali. Since metallic alkali is turned into a hydroxide which is of low reactivity relatively, it is possible to remove the resultant hydroxide from the mixture gas of the humidified gas and the exhaust gas readily and safely in the following step. Note that the phrases, "being lower reactivity" and "of low reactivity relatively," also mean to dilute a solution of alkaline substance so that the activity decreases.

When mixing the humidified gas with the exhaust gas, it is preferable to keep the temperatures of the mixture gas of the humidified gas and the exhaust gas at the dew point of the humidified gas or more, that is, at 25° C. or more. When the humidified gas is mixed with the exhaust gas at temperatures of the dew point of the humidified gas or more, an alkaline substance, which is contained in the exhaust gas, can form a hydroxide readily. If the humidified gas is mixed with the exhaust gas at temperatures of less than the dew point of the humidified gas, water, which is contained in the exhaust gas, produces water droplets, and the resulting water droplets might react with an alkaline substance or metallic alkali, which is contained in the exhaust gas, explosively. In certain cases, the resultant water droplets might have reacted with metallic alkali, which is contained in the exhaust gas, to ignite it.

In the step of trapping the generated hydroxide, the hydroxide, which is generated out of the mixture gas of the humidified gas and the exhaust gas, is removed by trapping. The trapping of the hydroxide makes it possible to remove metallic alkali, which is contained in the exhaust gas. Thus, it is possible to turn the exhaust gas into an exhaust gas free of any metallic alkali.

In the present method of processing an exhaust gas, the humidified gas can be mixed with the exhaust gas in any environment where an alkaline substance, such as metallic alkali, can produce hydroxide. That is, the humidified gas can be mixed with the exhaust gas inside a reaction chamber in which alkali activation is carried out. Alternatively, the humidified gas can be mixed with the exhaust gas outside a reaction chamber in which alkali activation is carried out. Specifically, the humidified gas can preferably be introduced into a reactor chamber, in which the carbon material is activated with an alkaline substance, and can preferably be thereby mixed with the exhaust gas in the step of generating a hydroxide of metallic alkali. If such is the case, it is possible to mix the humidified gas with the exhaust gas within a reactor chamber in which an activation reaction develops. Moreover, it is preferable as well to mix the humidified gas with the exhaust gas outside a reactor chamber, in which the carbon material is activated with an alkaline substance.

As far as the hydroxide, which is generated in the step of generating a hydroxide of metallic alkali, can be separated from the mixture gas of the humidified gas and the exhaust gas, the method for carrying out the step of trapping the generated hydroxide is not limited to known specific processing methods. In order to trap the hydroxide, it is preferable to dissolve the mixture gas of the humidified gas and the exhaust gas in a solution into which the hydroxide can dissolve and then to separate the mixture gas of the humidified gas and the exhaust gas from the solution. When the mixture gas of the humidified gas and the exhaust gas dissolves in a solution, it is possible to separate the mixture gas of the humidified gas and the exhaust gas from the solution, in which the hydroxide is dissolved. Note that a solution which can solve the generated hydroxide therein can preferably comprise water or water-based solutions.

Moreover, in order to trap the hydroxide, it is preferable to pass the mixture gas of the humidified gas and the exhaust gas through water. When the mixture gas of the humidified gas and the exhaust gas passes through the water, the mixture gas, which contains the hydroxide, contacts with water, and thereby the hydroxide in the mixture gas dissolves into water. Thus, the water removes the hydroxide from the mixture gas of the humidified gas and the exhaust gas which has passed through the water.

In addition, in order to trap the hydroxide, it is preferable to spray water onto the mixture gas of the humidified gas and the exhaust gas. When water is sprayed onto the mixture gas of the humidified gas and the exhaust gas, the mixture gas, which contains the hydroxide, contacts with water, and thereby the hydroxide in the mixture gas dissolves into water. Thus, the sprayed water removes the hydroxide from the mixture gas of the humidified gas and the exhaust gas onto which water has been sprayed.

The present method is for processing an exhaust gas, which generates during alkali activation. The present method can be applied not only to processing an exhaust gas, which generates during alkali activation carried out in the production of porous carbon material such as activated carbon, but also to processing an exhaust gas, which generates during alkali activation carried out in the production of non-porous carbon material.

EXAMPLES

Hereinafter, the present invention will be described with reference to a method of processing an exhaust gas according to specific examples of the present invention.

As the specific examples of the present invention, alkali activation was performed onto carbonized material to produce activated carbon which exhibited a large superficial area, and the exhaust gas, which generated during the alkali activation was processed variously.

Example No. 1

A method of processing an exhaust gas according to Example No. 1 of the present invention was carried out using a production facility whose major arrangements are illustrated in FIG. 1.

As shown in FIG. 1, the production facility comprised a calcining furnace 1, a humidified-gas producing apparatus 2, a gas-mixing chamber 3, a trapping apparatus 4, and a pipe line 5.

As for the calcining furnace 1, a calcining furnace was used which has been employed conventionally to carbonize and/or activate a raw material for producing activated carbon. The calcining furnace 1 could control the atmosphere within the reaction chamber. The atmosphere within the reaction chamber was controlled by an activation gas, which was supplied into the reaction chamber, and an exhaust gas, which was discharged from the reaction chamber. In Example No. 1, the activation gas was supplied into the reaction chamber continuously, and the exhaust gas was discharged from the reaction chamber continuously.

Figure 2:
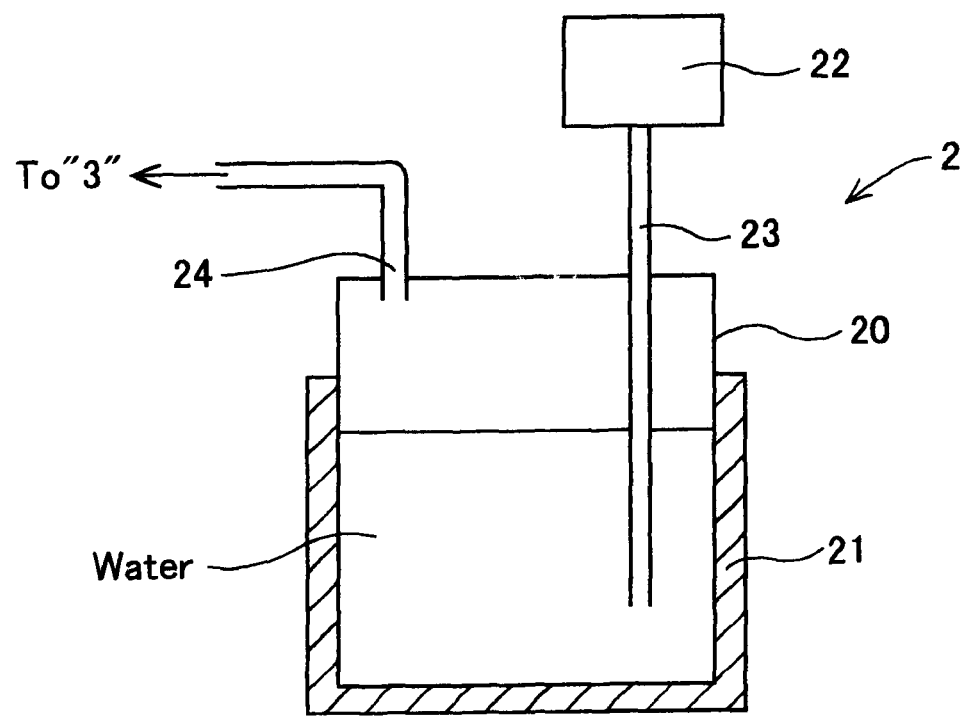
FIG. 2 is a diagram for illustrating an arrangement of a humidified-gas generating unit in the processing apparatus according to Example No. 1 of the present invention.

FIG. 2 illustrates a specific arrangement of the humidified-gas producing apparatus 2. As shown in the drawing, the humidified-gas producing apparatus 2 comprised a water tank 20, a heater 21, a nitrogen-gas supplying unit 22, a pipe 23, and a humidified-gas discharge opening 24. The water tank 20 reserved water therein in such a manner that it enclosed reserved water substantially. The heater 21 heated the water reserved in the water tank 20. The nitrogen-gas supplying unit 22 supplied a nitrogen gas into the water reserved in the water tank 20. The pipe 23 was connected to the nitrogen-gas supplying unit 22 at one of the opposite ends, and was placed in the water reserved in the water tank 20 at the other one of the opposite ends. The humidified-gas discharge opening 24 was opened in the top surface of the water tank 20.

In the humidified-gas producing apparatus 2, the nitrogen-gas supplying unit 22 supplied a nitrogen gas into the water tank 20 by way of the pipe 23. Within the water tank 20, moisture was given to the nitrogen gas when the nitrogen gas passed through the water reserved in the water tank 20. Then, the thus humidified nitrogen gas was discharged to the outside through the humidified-gas discharge opening 24. Thus, the humidified-gas producing apparatus 2 produced a humidified gas, which was composed of a nitrogen gas being inert to the other substances in the production of activated carbon, and water vapor dispersed in the nitrogen gas. Moreover, the humidified-gas producing apparatus 2 controlled the dew point of the resulting humidified gas according to the temperature of the reserved water, which the heater 21 heated, and the flow volume of the nitrogen gas, which the nitrogen-gas supplying unit 22 supplied.

The gas-mixing chamber 3 comprised a reaction chamber. In the reaction chamber, the exhaust gas, which was discharged from the calcining furnace 1, and the humidified gas, which was discharged from the humidified-gas producing apparatus 2, were mixed. Hence, the reaction chamber of the gas-mixing chamber 3 was formed so that it could fully mix the exhaust gas and humidified gas, which were supplied therein.

Figure 3:
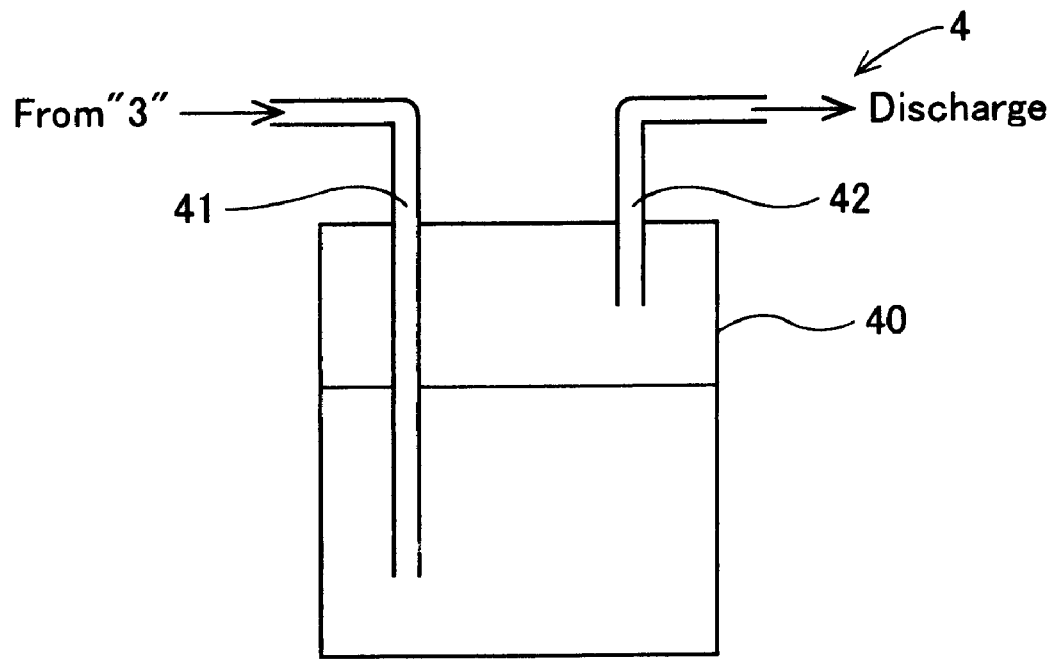
FIG. 3 is a diagram for illustrating an arrangement of a trapping unit in the processing apparatus according to Example No. 1 of the present invention.

FIG. 3 illustrates a specific arrangement of the trapping apparatus 4. As shown in the drawing, the trapping apparatus 4 comprised a water tank 40, a pipe 41, and an exhaust-gas discharge opening 42. The water tank 40 reserved water therein in such a manner that it enclosed reserved water substantially. The pipe 41 was connected to the gas-mixing chamber 3 at one of the opposite ends, and was placed in the water reserved in the water tank 40 at the other one of the opposite ends. Hence, the mixture gas of the exhaust gas and humidified gas, which was discharged from the reaction chamber of the gas-mixing chamber 3, was supplied into the water reserved in the water tank 40 through the pipe 41. The exhaust-gas discharge opening 42 was opened in the top surface of the water tank 40.

In the trapping apparatus 4, the mixture gas of the exhaust gas and humidified gas, which was discharged from the reaction chamber of the gas-mixing chamber 3, was supplied into the water tank 40 through the pipe 41. Within the water tank 40, water-soluble substances solved in water when the mixture gas passed through the water reserved in the water tank 40. Thus, the water-soluble substances were separated from the mixture gas. Then, the mixture gas free of the water-soluble substances was discharged to the outside through the exhaust-gas discharge opening 42.

As illustrated in FIG. 1, the pipe line 5 comprised a first pipe 50, a second pipe 51, and a third pipe 52. The first pipe 50 connected between the calcining furnace 1 and the gas-mixing chamber 3. The second pipe 51 connected between the humidified-gas producing apparatus 2 and the gas-mixing chamber 3. The third pipe 52 connected between the gas-mixing chamber 3 and the trapping apparatus 4.

Production of Activated Carbon

As a raw material for producing activated carbon, coal-based pitch was prepared. The prepared coal-based pitch had a fine structure similar to graphite, was amorphous comparatively, and exhibited low orientation.

The coal-based pitch was heated to a predetermined temperature, for instance, to a temperature of from 300 to 500° C. at a temperature increment rate of 5° C./minute under a predetermined pressure, for example, under a pressure of from 0.1 to 0.5 MPa. Thereafter, the coal-based pitch was kept heated at the predetermined temperature for a predetermined period of time, for instance, for 1 to 5 hours, and was thereby carbonized preliminarily.

Moreover, the preliminarily-carbonized coal-based pitch was heated to a predetermined temperature, for instance, to a temperature of from 700 to 900° C. at a temperature increment rate of 5° C./minute under a predetermined pressure, for example, under a pressure of 0.2 MPa or less. Thereafter, the preliminarily-carbonized coal-based pitch was kept heated at the predetermined temperature for a predetermined period of time, for instance, for 1 to 5 hours, and was thereby carbonized completely.

After the carbonizing treatment, the carbonized coal-based pitch was activated with an alkali compound. Note that, as for the alkali compound, it is possible to use hydroxides of metallic alkali and carbonates of metallic alkali, for instance. In the method of processing an exhaust gas according to Example No. 1 of the present invention, potassium hydroxide (KOH) was employed. The activation treatment was carried out by holding the mixture of the carbonized coal-based pitch and alkali compound at a temperature of from 700 to 900° C. for 4 to 10 hours while controlling the composition ratio of the carbonized coal-based pitch with respect to the alkali compound in a range of from 1:1 to 1:5 by weight ratio. In this instance, the mixture can preferably be held at a temperature of from 500 to 900° C., further preferably from 700 to 900° C., furthermore preferably at around 800° C. Moreover, the mixture was held in a nitrogen gas atmosphere. In addition, the alkali-compound activation treatment of the carbonized coal-based pitch was also carried out using the calcining furnace 1.

Then, the thus activated carbonized coal-based pitch was washed with water fully, and was thereafter pulverized. Finally, the resulting pulverized powder was calcined a temperature of from 700 to 900° C. for 4 to 10 hours in a nitrogen gas atmosphere using the calcining furnace 1 again. Note that the nitrogen gas atmosphere contained a hydrogen gas in a proportion of from 3 to 100 parts by volume with respect to a nitrogen gas taken as 100 parts by volume. Moreover, the pulverized powder can preferably be calcined at a temperature of from 500 to 900° C., further preferably from 700 to 900° C., furthermore preferably at around 800° C. Thus, activated carbon was produced while subjecting the exhaust gas, which was discharged during the alkali activation, to the method of processing an exhaust gas according to Example No. 1 of the present invention.

Processing of Exhaust Gas

In the method of processing an exhaust gas according to Example No. 1 of the present invention, the exhaust gas, which contained the alkali compound (i.e., KOH) as well as a pure metallic alkali (i.e., K) making the alkali compound, was discharged from the calcining furnace 1 continuously. Since the atmosphere within the calcining furnace 1 was a nitrogen gas atmosphere or a nitrogen gas with water vapor mixed during the alkali activation, the exhaust gas was composed of the alkali compound, the metallic alkali, the nitrogen gas, and water. The exhaust gas was introduced into the reaction chamber of the gas-mixing chamber 3 by way of the first pipe 50. Note that the exhaust gas exhibited a temperature of 50° C. when being introduced into the reaction chamber of the gas-mixing chamber 3.

Moreover, the humidified gas was introduced into the reaction chamber of the gas-mixing chamber 3 from the humidified-gas producing apparatus 2 by way of the second pipe 51. In this instance, the humidified gas, which was introduced into the reaction chamber of the gas-mixing chamber 3, exhibited a dew point of 40° C. and a temperature of 50° C. Within the reaction chamber of the gas-mixing chamber 3, the exhaust gas was mixed with the humidified gas. Accordingly, the pure metallic alkali, metallic potassium (K), in the exhaust gas reacted with the water in the moisture contained in the humidified gas to generate an alkali hydroxide, that is, potassium hydroxide (KOH) in the method of processing an exhaust gas according to Example No. 1 of the present invention. The resulting hydroxide (KOH) exhibited lower reactivity than that of the pure metallic alkali (K). Then, the mixture gas of the exhaust gas and humidified gas, which contained the hydroxide, was discharged from the gas-mixing chamber 3.

The mixture gas of the exhaust gas and humidified gas, which contained the hydroxide, was transferred to the trapping apparatus 4 by way of the third pipe 52. In the trapping apparatus 4, the mixture gas, which was transferred from the reaction chamber of the gas-mixing chamber 3, was supplied into the water bath 40 by way of the pipe 41. Within the water bath 40, the mixture gas passed through the water reserved in the water bath 40. In this instance, the hydroxide, which was contained in the mixture gas, dissolved into the reserved water. Note that no explosive reaction occurred when the mixture gas contacted with the water because the hydroxide (KOH) exhibited lower reactivity than that of the metallic alkali (K). The hydroxide thus dissolved into the reserved water so that the hydroxide was separated from the mixture gas. Eventually, the mixture gas, from which the hydroxide was removed, was discharged to the outside through the exhaust-gas discharge opening 42.

As described above, the mixture gas of the exhaust gas and humidified gas, which was discharged from the trapping apparatus 4, was turned into a safe exhaust gas from which the alkali compound as well as the pure metallic alkali were removed. Moreover, in the method of processing an exhaust gas according to Example No. 1 of the present invention, metallic alkali was little generated in the exhaust system for processing the exhaust gas discharged during the alkali activation even when the temperature of the exhaust gas decreased. In other words, the metallic alkali (K) in the exhaust gas discharged from the calcining furnace 1 was turned into the hydroxide (KOH) of low reactivity, and the trapping apparatus 4 separated the resulting hydroxide to remove it from the mixture gas. Consequently, in accordance with the method of processing an exhaust gas according to Example No. 1, it was possible to process the exhaust gas safely.

Example No. 2

Figure 4:
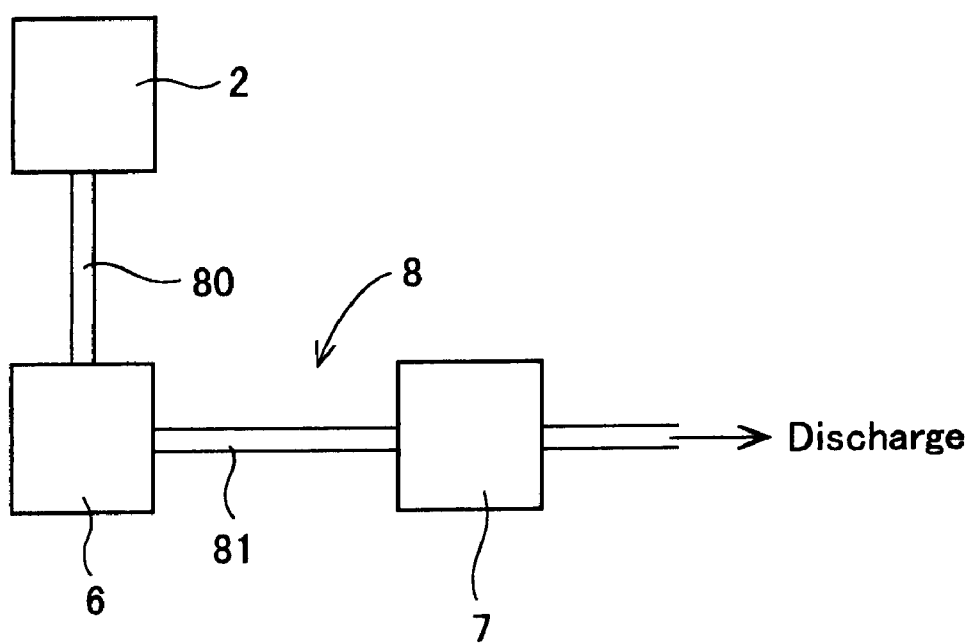
FIG. 4 is a diagram for illustrating an overall arrangement of a processing apparatus according to Example No. 2 of the present invention.

A method of processing an exhaust gas according to Example No. 2 of the present invention was carried out using a production facility whose major arrangements are illustrated in FIG. 4.

As shown in FIG. 4, the production facility comprised a calcining furnace 6, a humidified-gas producing apparatus 2, a trapping apparatus 7, and a pipe line 8.

Except that the calcining furnace 6 was provided with an inlet opening for introducing a humidified gas, which the humidified-gas producing apparatus 2 supplied, into the reaction chamber, the calcining furnace 6 was arranged in the same manner as the calcining furnace 1 used in Example No. 1.

The humidified-gas producing apparatus 2 was arranged in the same manner as the humidified-gas producing apparatus 2 used in Example No. 1.

Figure 5:
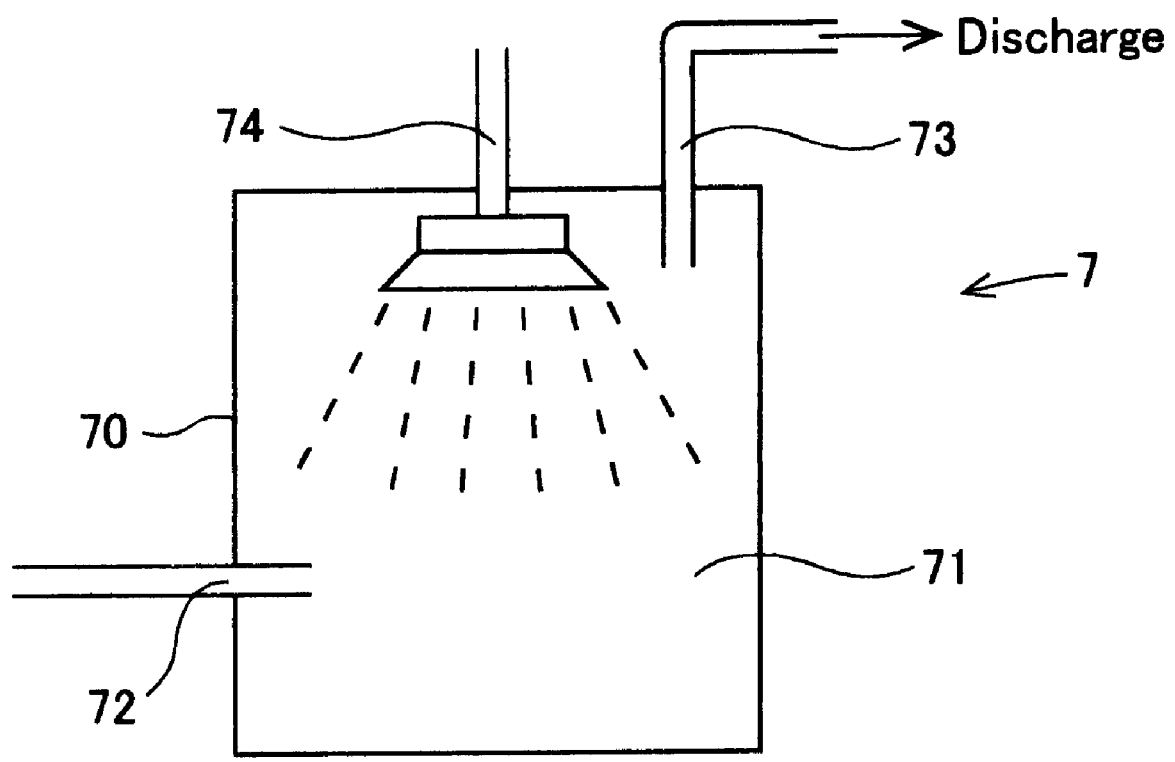
FIG. 5 is a diagram for illustrating an arrangement of a trapping unit in the processing apparatus according to Example No. 2 of the present invention.

FIG. 5 illustrates a specific arrangement of the trapping apparatus 7. As shown in the drawing, the trapping apparatus 7 comprised a housing wall 70, a reaction chamber 71, a gas inlet opening 72, a gas discharge opening 73, and a spraying device 74. The housing wall 70 demarcated the reaction chamber 71. The gas inlet opening 72 was disposed on a lower side of the reaction chamber 71, and was opened in the housing wall 70. The gas discharge opening 73 was disposed on an upper side of the reaction chamber 71, and was opened in the housing wall 70. The spraying device 74 was disposed on an upper side of the reaction chamber 71, and sprayed water droplets, i.e., water, within the reaction chamber 71.

Thus, the trapping apparatus 7 was arranged so that a gas was introduced into the reaction chamber 71 through the gas inlet opening 72, which opened on a lower side of the reaction chamber 71; the introduced gas passed inside the reaction chamber 71; and the introduced gas was discharged through the gas discharge opening 73, which opened on an upper side of the reaction chamber 71. Moreover, the spraying device 74 sprayed water droplets, i.e., water, within the reaction chamber 71. Specifically, in the trapping apparatus 7, the gas passing within the reaction chamber 71 contacted with the water droplets supplied from the spraying device 74, and thereby water-soluble components in the gas were solved into the water droplets so that they were separated from the gas. In addition, the gas, from which the water-soluble components were removed, was discharged through the gas discharge opening 73. Note that the trapping apparatus 7 further comprised a water recovering unit (not shown) for recovering water, which had been sprayed as the water droplets.

As shown in FIG. 4, the pipe line 8 comprised a first pipe 80, and a second pipe 81. The first pipe 80 connected between the humidified-gas producing apparatus 2 and the calcining furnace 6. The second pipe 81 connected between the calcining furnace 6 and the trapping apparatus 7.

Using the thus constructed production facility, activated carbon was produced in the same manner as set forth in Example No. 1. Hence, activated carbon was produced while subjecting the exhaust gas, which was discharged during the alkali activation, to the method of processing an exhaust gas according to Example No. 2 of the present invention.

Processing of Exhaust Gas

During the production of the activated carbon, a gas existed in the reaction chamber of the calcining chamber 6 when the alkali activation developed. The gas contained the alkali compound (i.e., KOH) as well as a pure metallic alkali (i.e., K) making the alkali compound. Moreover, since the atmosphere within the calcining furnace 6 was a nitrogen gas atmosphere or a nitrogen gas atmosphere with water vapor mixed during the alkali activation, the gas, which existed within the calcining furnace 6, was composed of the alkali compound, the metallic alkali, a nitrogen gas, and water.

In addition, the production facility was arranged so that the humidified-gas producing apparatus 2 produced the humidified gas; and the humidified gas, supplied from the humidified-gas producing apparatus 2, was introduced into the reaction chamber of the calcining furnace 6, in which the alkali activation was developing, by way of the first pipe 80. In this instance, the humidified gas, which was introduced into the reaction chamber of the calcining furnace 6, exhibited a dew point of 40° C. and a temperature of 50° C. Within the reaction chamber of the calcining furnace 6, the exhaust gas was mixed with the humidified gas. Accordingly, the pure metallic alkali, metallic potassium (K), in the exhaust gas reacted with the water in the humidified gas to generate an alkali hydroxide, that is, potassium hydroxide (KOH) in the method of processing an exhaust gas according to Example No. 2 of the present invention.

Then, the mixture gas of the humidified gas and exhaust gas, which contained the hydroxide, was discharged from the calcining furnace 6.

The mixture gas of the humidified gas and exhaust gas, which contained the hydroxide, was transferred to the trapping apparatus 7 by way of the second pipe 81. In the trapping apparatus 7, the mixture gas, which was transferred from the reaction chamber of the calcining furnace 6, was supplied into the reaction chamber 71 through the gas inlet opening 72. Within the reaction chamber 71 into which the mixture gas flowed, the spraying device 74 sprayed water droplets, i.e., water. Eventually, the mixture gas passed through the reaction chamber 71, which was filled with sprayed water, and was discharged to the outside through the gas discharge opening 73. In this instance, the mixture gas contacted with the sprayed water (or water droplets), which the spraying device 74 supplied, and thereby hydroxide, which was contained in the mixture gas, dissolved into the sprayed water (or water droplets). Thus, the hydroxide dissolved into the sprayed water (or water droplets) so that the hydroxide was separated from the mixture gas.

As described above, the mixture gas of the humidified gas and exhaust gas, which was discharged from the trapping apparatus 7, was turned into a safe exhaust gas from which the alkali compound as well as the pure metallic alkali were removed. Moreover, in the method of processing an exhaust gas according to Example No. 2 of the present invention, metallic alkali was little generated in the exhaust system for processing the exhaust gas discharged during the alkali activation even when the temperature of the exhaust gas decreased. In other words, the metallic alkali (K) in the exhaust gas discharged from the calcining furnace 6 was turned into the hydroxide (KOH) of low reactivity, and the trapping apparatus 7 separated the resulting hydroxide to remove it from the exhaust gas. Consequently, in accordance with the method of processing an exhaust gas according to Example No. 2, it was possible to process the exhaust gas safely.

Modified Versions

When substituting the trapping apparatus 7, used in the production facility to which the method of processing an exhaust gas according to Example No. 2 of the present invention were applied, for the trapping apparatus 4, used in the production facility to which the method of processing an exhaust gas according to Example No. 1 of the present invention was applied, or vise versa, it is possible to produce the same beneficial effects as Example Nos. 1 and 2.

Specifically, the production facility according to Example No. 1 in which the trapping apparatus 7 according to Example No. 2 substituted for the trapping apparatus 4 according to Example No. 1 effected the same advantages. Likewise, the production facility according to Example No. 2 in which the trapping apparatus 4 according to Example No. 1 substituted for the trapping apparatus 7 according to Example No. 2 effected the same advantages.

Moreover, in Example Nos. 1 and 2, the alkali-activation atmosphere was a nitrogen gas atmosphere. However, it is advisable to carry out the alkali activation in a nitrogen gas atmosphere with water vapor mixed. When the alkali-activation atmosphere includes water vapor, no metallic alkali generates in the exhaust gas. Accordingly, such a modified version demonstrates the advantage of processing the exhaust gas safely as well. In addition, even when alkali-activation atmosphere includes water vapor, the trapping apparatus 4 or 7 according to Example No. 1 or 2 can remove the hydroxides of metallic alkalis. Consequently, it is possible to carry out the processing exhaust gas safely.

Having now fully described the present invention, it will be apparent to one of ordinary skill in the art that many changes and modifications can be made thereto without departing from the spirit or scope of the present invention as set forth herein including the appended claims.

What is claimed is:

1. An apparatus for processing an exhaust gas containing an alkaline substance, the exhaust gas being discharged when activating a carbon material with an alkaline substance, and the apparatus comprising:
    a humidified-gas preparing device that operates to prepare a humidified gas, the humidified gas exhibiting a dew point of 25° C. or more;
    a gas mixing device that operates to mix the humidified gas with the exhaust gas at a temperature equal to or greater than the dew point of the humidified gas to form a mixture gas, thereby generating a hydroxide of metallic alkali; and
    a trapping device that operates to trap the generated hydroxide out of the mixture gas.

2. The apparatus set forth in claim 1 further comprising a reactor chamber, into which the humidified gas is introduced and in which the carbon material is activated with the alkaline substance, thereby mixing the humidified gas with the exhaust gas.

3. The apparatus set forth in claim 1 further comprising a reactor chamber, in which the carbon material is activated with the alkaline substance, wherein the humidified gas is mixed with the exhaust gas outside the reactor chamber, thereby mixing the humidified gas with the exhaust gas.

4. The apparatus set forth in claim 1, wherein the trapping device comprises reserved water through which the mixture gas passes, thereby trapping the generated hydroxide.

5. The apparatus set forth in claim 1, wherein the trapping device comprises a spraying device for spraying water onto the mixture gas, thereby trapping the generated hydroxide.

6. The apparatus set forth in claim 1, wherein the humidified gas comprises a carrier gas, which is composed of an inert gas, and water vapor, which is dispersed in the carrier gas.

7. The apparatus set forth in claim 1, wherein the humidified-gas preparing device prepares a humidified gas, which exhibits a dew point falling in a range of from 25 to 80° C.

8. An apparatus for processing an exhaust gas containing an alkaline substance, the exhaust gas being discharged when activating a carbon material with an alkaline substance, and the apparatus consisting of:
    a humidified-gas preparing device that operates to prepare a humidified gas, the humidified gas exhibiting a dew point of 25° C. or more;
    a gas mixing device that operates to mix the humidified gas with the exhaust gas at a temperature equal to or greater than the dew point of the humidified gas to form a mixture gas, thereby generating a hydroxide of metallic alkali; and
    a trapping device that operates to trap the generated hydroxide out of the mixture gas.

* * * * *